Sept. 24, 1946.  O. GERBES  2,408,018
ISOMERIZATION PROCESS
Filed Nov. 23, 1944
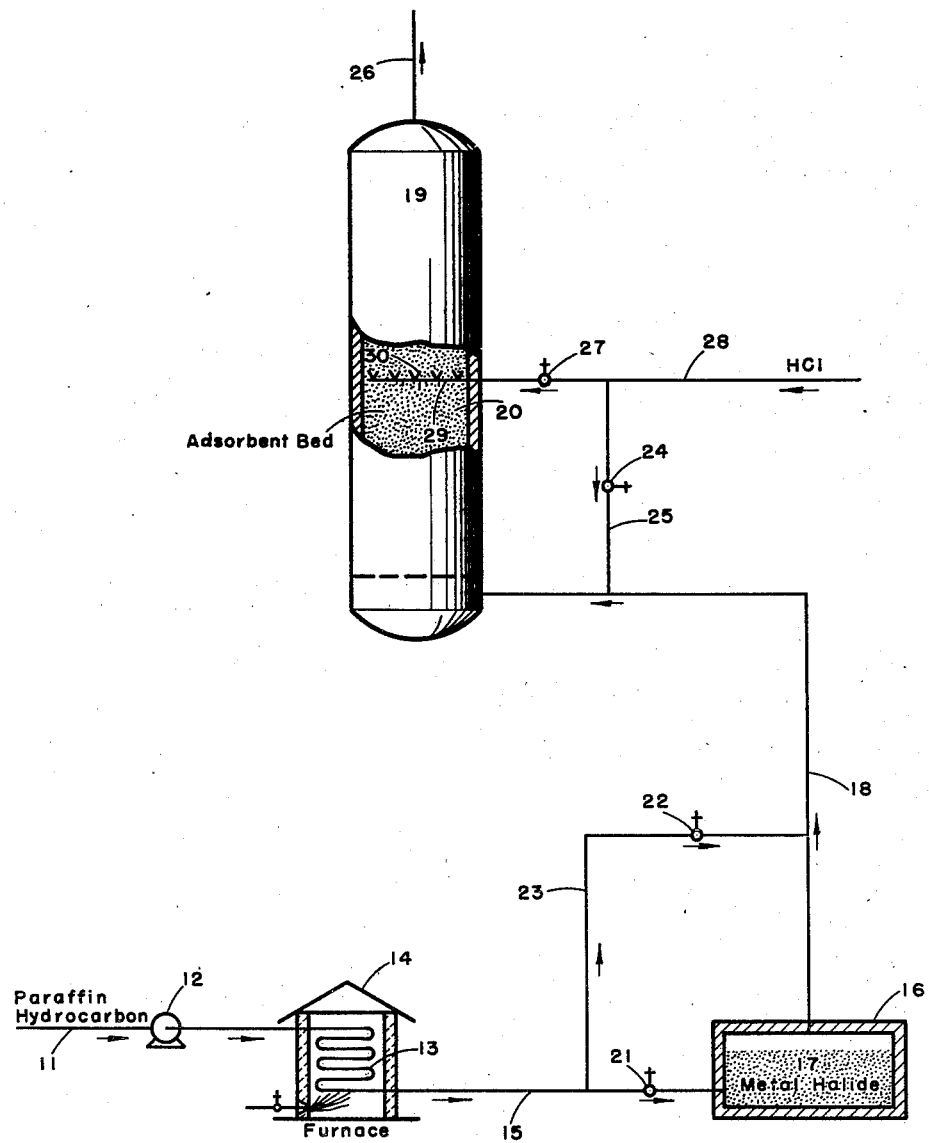
Otto Gerbes INVENTOR.
BY
J D McKean
ATTORNEY.

Patented Sept. 24, 1946

2,408,018

UNITED STATES PATENT OFFICE 2,408,018

ISOMERIZATION PROCESS

Otto Gerbes, Goose Creek, Tex., assignor to Standard Oil Development Company, a corporation of Delaware Application November 23, 1944, Serial No. 564,809

3 Claims. (Cl. 260—683.5)

The present invention is directed to a catalytic process in which a vaporizable metal halide is carried on a porous support. More particularly, it is concerned with the vapor phase isomerization of paraffinic hydrocarbons in which a vaporizable metal halide is adsorbed on a porous carrier and employed as the catalyst.

In processes of the general nature referred to above such as isomerization processes carried out in the vapor phase, for example, isomerization of n-butane to isobutane, a heated vaporous hydrocarbon is passed in contact with a catalyst mass, on which is adsorbed a metal halide, for a time sufficient for substantial conversion of the vaporous hydrocarbon to the corresponding iso form. The temperature in the reaction zone is usually of the order of about 200 to 350° F. with sufficient pressure to avoid condensation of the hydrocarbon. During the outset of the isomerization reaction, it is customary to use temperatures in the range between 250° to 270° F. or slightly higher and as the catalyst loses its activity to increase the temperature in the reaction zone to maintain conversion at a relatively high level. Ordinarily it is customary to provide as promoter for the reaction an anhydrous hydrogen halide such as hydrogen chloride in an amount between about 2 and 10% by weight based on the hydrocarbon being isomerized.

The vapor pressure of metal halides such as aluminum halide on porous adsorbents such as bauxite or Porocel is appreciable and, therefore, the metal halide vaporizes from the catalyst support, dissolves in the vaporous hydrocarbon and is carried away from the reaction zone resulting in a depletion of the catalyst. Thus when catalyst activity falls off, it becomes necessary to add additional metal halide to maintain conversion at an economic high level.

Reactivation of isomerization catalysts and the like employed in vapor phase processes of the general type referred to above is usually carried out by subliming the metal halide such as aluminum halide onto a porous support. This is generally accomplished by passing the vaporous hydrocarbon feed upward through a body of heated metal halide whereby the metal halide is carried along with the vaporous feed and is deposited on the porous support. In some instances, it is desirable to employ an inert gas as the carrying agent for the metal halide when subliming it onto the support.

When using a prepared bed as above described in normal isomerization operations with hydrocarbon vapors and a promoter being passed through the bed, it will be understood that metal halide sublimes from the support and metal halide vapors are present in the spaces between the catalyst support but is substantially in equilibrium with the metal halide deposited on the support. When metal halide vapors are being added to the bed, as when originally preparing the bed or when renewing depleted portions of the bed, the concentration of the metal halide in the spaces adjacent the support is substantially in excess of the equilibrium concentration.

One great difficulty in operation of isomerization processes of the type referred to is that there is formed during the reaction tarry, sludgy bodies which foul the porous adsorbent bed causing build up of pressure drop across the bed with a resultant reduction in throughput besides loss of catalyst activity due to the consumption of the metal halide. Formation of the tarry and sludgy bodies is believed to be due in part to reaction between the metal halide and impurities contained in the feed stock and in part to the formation of complex compounds by inter-reaction between the metal halide and the promoter and the hydrocarbons undergoing reaction.

The fouling problem became so severe in one commercial operation that it was necessary to resort to a method for reactivating the porous bed whereby the promoter was withheld from the reaction zone during periods when metal halide was added thereto. This last mentioned process is described and claimed in pending application U. S. Serial No. 519,306, filed January 22, 1944, for William B. Franklin. In the last mentioned process, it is the practice to withhold addition of hydrogen chloride catalyst promoter to an isomerization reaction zone while adding aluminum chloride thereto whereby the porous adsorbent bed remains free from complex compounds which ordinarily foul it during these periods of reactivation. One disadvantage of the process described and claimed in U. S. Serial No. 519,306 is that during the periods when promoter is withheld from the reaction zone, the amount of isoparaffin produced in the reaction is reduced about 50%. During these periods of reactivation, some isoparaffin is produced since a small amount of promoter is present in the reaction zone as a residual amount either produced in the reaction itself or carried over from periods of introduction of promoter in the reaction zone.

The seriousness of the loss in capacity during these periods of reactivation is such that a commercial unit which has a rated capacity of about 2500 barrels per day is only able to produce at the rate of about 1250 barrels per day during these periods when the catalyst is being reactivated. Since these periods of reactivation comprise about 10% of the total onstream period, it can be readily seen that a serious loss of capacity is suffered by withholding promoter from the reaction zone during periods of reactivation. Of course, it is realized that the loss is suffered rather than foul up the catalyst bed and thus cause the reaction to become inoperable.

In accordance with the present invention full capacity of a given isomerization unit is maintained during periods when the catalyst bed is being reactivated by addition of metal halide to it. This is accomplished by providing an intermediate point for injection of promoter in a given isomerization reactor in processes of the general type referred to so that the portion of the catalyst bed below the intermediate point may be reactivated by addition of metal halide thereto while promoter is being added to the other portion of the bed down stream from the intermediate point for addition of promoter. In this manner the beneficial effects described and claimed in U. S. Serial No. 519,306 is obtained for the portion of the bed up stream from the intermediate point in which no promoter is added while the down stream portion is converting hydrocarbons.

It is believed that, in a vapor phase butane isomerization process utilizing aluminum chloride supported on a porous adsorbent such as bauxite or Porocel, the reaction zone may be visualized as comprising zones of relatively low catalytic activity and relatively high catalytic activity. At the beginning of the isomerization cycle, for example in an upflow isomerization reactor, the lower portion of the catalyst bed is activated by addition of volatilized aluminum chloride. The upper portion of the bed may be relatively deficient in aluminum chloride, but after certain initial periods of operation, the aluminum chloride migrates upwardly to the upper portion of the catalyst bed and the lower portion will become progressively depleted. As the lower portion becomes progressively depleted of aluminum chloride, the upper portion adsorbs aluminum chloride until it is saturated at the equilibrium condition between the porous adsorbent and the aluminum chloride in the passing vapor stream. Once the upper portion contains aluminum chloride, the aluminum chloride is retained to the extent permitted by equilibrium with the vapor stream containing aluminum chloride from the lower portion of the catalyst bed, the remaining aluminum chloride passing out of the reaction zone with the reaction products. It is thus seen that at the end of the cycle, the lower section of a catalyst bed will be deficient in aluminum chloride and thus relatively inactive in isomerization ability whereas the upper section will be relatively rich in aluminum chloride and still remain relatively active.

Now if the temperatures in the upper section of a catalyst bed were increased as is conventional practice to compensate for the decreased activity, the production rate may be maintained by providing a bypass for introduction of promoter gas around the lower section thereof.

It is, therefore, an object of the present invention to maintain a given isomerization bed at full capacity levels by reactivating a portion of the catalyst bed while simultaneously continuing isomerization at high conversion levels in another portion of the same bed.

The present invention may be briefly described as involving the treatment of a catalyst bed, including a carrier on which a metal halide has been deposited, which has been employed for isomerization reactions so that a substantial portion of the metal halide has been removed from a part of the prepared bed. In accordance with the present invention, metal halide vapors are added to the depleted portion of the bed so that the concentration of the metal halide vapors in this part of the bed is substantially greater than the equilibrium, while in a remaining portion of the bed, in which the metal halide vapors are substantially in equilibrium with the carrier, a promoter is added and an isomerization reaction is conducted. The promoter is withheld from that portion of the bed in which the concentration of the metal halide vapors is substantially in excess of the equilibrium concentration. In other words, the present invention is directed to a method whereby a depleted portion of a catalyst bed is renewed by passing metal halide vapors into this part of the bed while in another part of the bed, where the metal halide vapors are substantially in equilibrium with the carrier, a promoter is added so that normal isomerization operations are conducted in this part of the bed.

The present invention will be better understood by reference to the single figure which is a front elevation in partial section of an arrangement of apparatus for carrying out the invention. Referring now to the drawing, numeral 11 designates a line carrying a paraffin hydrocarbon such as n-butane from a source not shown. This hydrocarbon is pumped by pump 12 into coil 13 where the hydrocarbon is vaporized and heated to a temperature sufficient for reaction by passage through furnace 14. The vaporous hydrocarbon issuing from coil 13 by line 15 passes through a vessel 16 containing a mass of aluminum chloride 17 which is sublimed and carried along by line 18 with the vaporous stream leaving the vessel. The vaporous stream carrying sublimed aluminum chloride is introduced into a reaction zone 19 in which a bed of adsorbent material 20 is provided. As the vaporous hydrocarbon passes through the reaction zone 19, the sublimed aluminum chloride carried thereby is deposited on the porous adsorbent and the combination of the two results in an efficient isomerization catalyst. Once the porous adsorbent bed 20 becomes saturated with respect to the aluminum chloride, valve 21 in line 15 is closed off and valve 22 in branch line 23 is opened allowing the vaporous hydrocarbon in line 15 to bypass vessel 16 and enter line 18. When valve 21 is closed off and valve 22 is opened up, promoter gas, for example, anhydrous hydrogen chloride, is introduced into line 18 by opening valve 24 in line 25. Isomerization of the hydrocarbons being routed through reaction zone 19 takes place on passage through the bed 20 and the products issue from zone 19 by line 26 for further handling and recovery of the isomerized product and unconsumed promoter. Since recovery of the reaction product and unconsumed promoter do not form a part of my invention, further details of these operations will not be given here. When the production rate of isomerized product falls by virtue of catalyst bed 20 becoming depleted in aluminum chloride, it becomes necessary to add more aluminum chloride to the reaction zone 19.

In accordance with the present invention, this is accomplished by opening up valve 21 in line 15 and closing off valve 22 in line 23 allowing passage of the vaporous hydrocarbons through the vessel 16 to pick up aluminum chloride for deposition on the bed 20. At the time valve 21 is opened and valve 22 is closed off, valve 24 in line 25 is also closed off to withhold hydrogen chloride from the lower section of bed 20; valve 27 in line 28 is then opened allowing hydrogen chloride to be introduced through a distributor pipe 29 and jets 30 into the upper portion of the bed 20.

While introducing hydrogen chloride in the upper section of the bed 20 in accordance with the present invention, it may be desirable to increase the temperature of the vaporous hydrocarbons entering the bed 20 to compensate for a possible loss of activity due to employment of a smaller catalyst bed.

It will thus be seen that the bottom portion of bed 20 defined by distributor 29 may be reactivated by addition of aluminum chloride thereto while the portion above distributor 29 is being employed to isomerize hydrocarbons at the full capacity level thus continuing isomerization and reactivating the catalyst bed without fouling due to formation of complexes.

Care must be exercised in controlling the amount of aluminum chloride injected into the lower portion of the bed 20 while reactivating it since if an uncontrolled amount of aluminum chloride were added thereto, fouling would be encountered in the upper section of the bed due to excessive carry out of aluminum chloride from the lower portion of the bed being reactivated. Since it is undesirable to add more aluminum chloride than the bed will adsorb or what is needed for reactivation of the catalytic bed, this is not a major obstacle to the success of my invention. It is contemplated that aluminum chloride may be added to the lower section of the bed 20 during periods of reactivation in an amount of about 2 to 3 per cent by weight of the total adsorbent bed. Some latitude is allowed in the amount of aluminum chloride added but in no case should the amount added exceed 5% by weight of the total adsorbent bed.

In reactivating a porous adsorbent bed in a commercial isomerization unit (a reactor containing a total of about 45,000 pounds of Porocel as an adsorbent after about 10 days' operation at an initial temperature of 270° F. and a temperature of 300° F. at the end of the cycle with an hydrogen chloride injection of from about 4 to 7 per cent by weight of the hydrocarbon), aluminum chloride in an amount of 2 to 3 per cent by weight of the total adsorbent bed is added to line 18 while hydrogen chloride is being added to the bed 20 through line 28. The temperature in the upper section of bed 20 to which hydrogen chloride is added is maintained at temperatures in the range of about 290 to 300° F. The amount of aluminum chloride added to the lower portion of the bed 20 is about 900 to 1350 pounds for reactivation of the bed. During the periods of injection of aluminum chloride to the lower section of the bed 20, the upper section is isomerizing at full capacity.

Those experienced in the art will realize that the different sections of the bed need not be in the same vessel as shown in the preferred embodiment and may consist of a number of separate vessels in series. It is also contemplated that the portion of the bed which is being reactivated or in which isomerization continues may comprise a plurality of beds in series. Ordinarily, however, it is contemplated that the invention will be practiced in sections of catalyst beds adjacent each other.

The nature and objects of the present invention having been fully described and illustrated, what I wish to claim as new and useful and to secure by Letters Patent is:

1. In a continuous isomerization process in which a normal paraffin of at least four carbon atoms per molecule in admixture with promotional amounts of hydrogen halide are contacted under isomerization reaction conditions with a catalyst bed comprising anhydrous aluminum halide adsorbed on a porous support, the steps of replacing, at intervals indicated by decreased activity of the catalyst bed, the hydrogen halide in the feed mixture with anhydrous aluminum halide without substantially altering conditions of operation, and introducing during said replacement hydrogen halide to the catalyst bed at a point where the aluminum halide vapors are substantially in equilibrium with aluminum halide adsorbed on the porous support, the replacement in each instance being of sufficient duration to effect a substantial restoration of the activity of the catalyst bed.

2. A process for isomerizing a normal paraffin having at least four carbon atoms which comprises continuously feeding said paraffin in admixture with a promotional amount of hydrogen halide into a reaction vessel containing a catalyst bed comprising anhydrous aluminum halide adsorbed on a porous support and maintained under suitable isomerization reaction conditions, continuously withdrawing a product from said reaction vessel, continuing this operation until the activity of the catalyst bed falls substantially below the desired level, replacing the hydrogen halide in the feed stock with anhydrous aluminum halide vapors without substantially altering the conditions in the reaction vessel, introducing hydrogen halide to the catalyst bed at a point where the aluminum halide vapors are substantially in equilibrium with aluminum halide adsorbed on the porous support, continuing the changed feed until the activity of the catalyst bed is restored to a substantial degree, replacing aluminum halide in the feed by hydrogen halide and terminating the introduction of hydrogen halide to the catalyst bed at said point where the aluminum halide vapors are substantially in equilibrium with aluminum halide adsorbed on the porous support.

3. A process in accordance with claim 2 in which the aluminum halide vapors replacing the hydrogen halide in the feed comprise not more than 5% by weight of the porous support.

OTTO GERBES.